US009410471B2

United States Patent
Bäumchen

(10) Patent No.: US 9,410,471 B2
(45) Date of Patent: Aug. 9, 2016

(54) EXHAUST SYSTEM COMPONENT

(71) Applicant: Eberspächer Exhaust Technology GmbH & Co. KG, Neunkirchen (DE)

(72) Inventor: Carsten Bäumchen, Oberthal (DE)

(73) Assignee: Eberspächer Exhuast Technology GmbH & Co. KG, Neunkirchen (DE)

( * ) Notice: Subject to any disclaimer, the term of this patent is extended or adjusted under 35 U.S.C. 154(b) by 120 days.

(21) Appl. No.: 14/268,328

(22) Filed: May 2, 2014

(65) Prior Publication Data
US 2014/0325969 A1    Nov. 6, 2014

(30) Foreign Application Priority Data

May 3, 2013 (DE) .......................... 10 2013 208 184

(51) Int. Cl.
| | |
|---|---|
| *F01N 3/00* | (2006.01) |
| *F01N 13/18* | (2010.01) |
| *F01N 3/24* | (2006.01) |
| *F01N 3/28* | (2006.01) |
| *F01N 13/08* | (2010.01) |
| *F01N 3/021* | (2006.01) |

(52) U.S. Cl.
CPC .......... *F01N 13/1844* (2013.01); *F01N 3/0211* (2013.01); *F01N 3/24* (2013.01); *F01N 3/2839* (2013.01); *F01N 13/08* (2013.01); *F01N 13/18* (2013.01); *F01N 13/1827* (2013.01); *F01N 13/1838* (2013.01); *F01N 2450/22* (2013.01); *F01N 2470/24* (2013.01); *Y02T 10/20* (2013.01)

(58) Field of Classification Search
None
See application file for complete search history.

(56) References Cited

U.S. PATENT DOCUMENTS

| 1,736,319 | A | | 11/1929 | Maxim | |
|---|---|---|---|---|---|
| 4,109,753 | A | * | 8/1978 | Lyman | ...................... F01N 1/10 181/252 |
| 4,570,747 | A | | 2/1986 | Ortyl | |
| 5,186,502 | A | * | 2/1993 | Martin | .................. F16L 39/005 138/112 |
| 5,606,857 | A | * | 3/1997 | Harada | .................... F01N 13/08 60/322 |
| 7,784,273 | B2 | * | 8/2010 | Kanaya | .............. B01D 53/9431 60/286 |
| 8,607,555 | B2 | * | 12/2013 | Kaiser | ................. B01F 3/04049 60/286 |
| 9,095,827 | B2 | * | 8/2015 | Sampath | ............... B01F 5/0473 |

(Continued)

FOREIGN PATENT DOCUMENTS

| DE | 199 62 311 A1 | 7/2001 |
|---|---|---|
| DE | 100 21 809 C1 | 11/2001 |

(Continued)

*Primary Examiner* — Jesse Bogue
(74) *Attorney, Agent, or Firm* — McGlew and Tuttle, P.C.

(57) ABSTRACT

An exhaust system component (1), for an exhaust system of an internal combustion engine, includes a metallic first part (3), which is inserted into a metallic second part (2), such that an inner jacket section (7) of the first part (3) is arranged coaxially in an outer jacket section (5) of the second part (2), as well as at least one weld joint (10), which permanently connects the outer jacket section (5) to the inner jacket section (7). To simplify the assembly of the parts (2, 3) with one another, a plurality of centering contours (11, 12) are formed integrally on the outer jacket section (5), projecting inwardly, and/or are formed integrally on the outer jacket section (7), projecting outwardly, and are located at spaced locations from one another in the circumferential direction (6). The centering contours center the inner jacket section (7) in the outer jacket section (5).

17 Claims, 3 Drawing Sheets

(56) References Cited

U.S. PATENT DOCUMENTS

| | | | |
|---|---|---|---|
| 2008/0066448 A1* | 3/2008 | Halbei | F01N 3/2066 60/282 |
| 2008/0134671 A1* | 6/2008 | Nefischer | B01D 53/90 60/300 |
| 2008/0267780 A1 | 10/2008 | Wirth | |
| 2009/0065296 A1* | 3/2009 | Chang | F01N 3/2842 181/255 |

FOREIGN PATENT DOCUMENTS

| | | |
|---|---|---|
| DE | 103 57 953 A1 | 7/2005 |
| DE | 10 2004 037 480 A1 | 3/2006 |
| EP | 1985356 A2 | 10/2008 |
| JP | H07-158435 A | 6/1995 |
| JP | 2000-74267 A | 3/2000 |
| JP | 2008-274941 A | 11/2008 |
| JP | 2009-108726 A | 5/2009 |

* cited by examiner

EXHAUST SYSTEM COMPONENT

CROSS REFERENCE TO RELATED APPLICATIONS

This application claims the benefit of priority under 35 U.S.C. §119 of German Patent DE 10 2013 208 184.7 filed May 3, 2013, the entire contents of which are incorporated herein by reference.

FIELD OF THE INVENTION

The present invention pertains to an exhaust system component for an exhaust system of an internal combustion engine.

BACKGROUND OF THE INVENTION

Components of exhaust systems are, for example, mufflers, particle filters, catalytic converters. Complex exhaust gas treatment device, which combine a plurality of functions at the same time and may contain, for example, a particle filter, various catalytic converters and a muffler, are known as well. In addition to an SCR catalytic converter, there exists in SCR systems a reducing agent introduction means, by means of which a usually liquid reducing agent can be introduced into an exhaust gas stream upstream of the SCR catalytic converter. To make it possible to mix the reducing agent sufficiently with the exhaust gas, a mixing tube, which defines a mixing section and/or which may contain a static mixer, is usually arranged between the reducing agent introduction device and the SCR catalytic converter. SCR device "Selective Catalytic Reduction." An aqueous urea solution may usually be used as a reducing agent.

A first part is usually inserted into a second part in a plurality of such exhaust system components. For example, a tube acting as a first part of the component may be passed through a bottom as a second part of the component in such a component. The respective bottom may have a passage opening for this, which is enclosed by a conduit. This conduit is advantageously formed integrally with the respective bottom. For example, such a conduit may be manufactured as a so-called "eyelet," i.e., by deformation. This conduit defines an outer jacket section of the second part. A section of the tube arranged in the conduit defines here an inner jacket section of the first part. To fix the tube to the bottom, it is common to prepare a plurality of welding spots distributed in the circumferential direction or to prepare a closed, circumferential weld seam. To make it possible to insert the tube into the passage opening in a simple manner, a radial clearance is usually provided between an outer contour of the tube and an inner contour of the conduit. In case only weld spots arranged in a distributed pattern are used instead of a circumferential weld seam, the radial clearance may be dimensioned such that sufficient sealing can be achieved between the bottom and the tube. The sealing action is achieved here in the manner of a choke sealing gap. Avoidance of excessive leaks is in the foreground here, whereas an especially good sealing action is not necessary, as a rule. To achieve the desired sealing action, it is necessary for the radial clearance to be distributed as uniformly as possible in the circumferential direction. If more stringent requirements are imposed on the tightness of the connection, it is, however, preferable to prepare a closed, circumferential weld seam. It was found that the radial clearance is usually smallest during conventional assembly in the area of the first weld spot or of the beginning of the weld seam, whereas it is usually the greatest diametrically opposite the first weld spot or the beginning of the weld seam. Expensive finishing operations may become necessary as a result.

A corresponding problem also arises when inserting a static mixer as the first part into an exhaust pipe, as a further part, if a jacket of the mixer is to be fixed in the exhaust pipe by means of weld joints.

SUMMARY OF THE INVENTION

The object of the present invention is to propose an improved embodiment for an exhaust system component, which is characterized especially in that the effort needed for manufacture is reduced.

According to the invention, and exhaust system component is provided for an exhaust system of an internal combustion engine. The exhaust system component comprises at least one metallic first part, which is inserted into a metallic second part, such that an inner jacket section of the first part is arranged coaxially in an outer jacket section of the second part. At least one weld joint permanently connects the outer jacket section to the inner jacket section. A plurality of centering contours are formed integrally on the outer jacket section, projecting inwardly, and/or on the inner jacket section, projecting outwardly. The centering contours are located at spaced locations from one another in a circumferential direction. The centering contours center (centrally locate) the inner jacket section in the outer jacket section.

The present invention is based on the general idea of providing the centering contours, which center the parts inserted into one another relative to one another, i.e., align them concentrically in relation to one another, on the components inserted into one another. Such centering contours may be formed integrally on an outer contour of the inner part, i.e., on the inner jacket section and/or integrally on an inner contour of the outer part, i.e., on the outer jacket section. These centering contours are arranged distributed in the circumferential direction and are arranged, in addition, at spaced locations from one another in the circumferential direction. Centered arrangement is already achieved, between the parts to be connected to one another, by means of the centering contours, before the welded connection is prepared, so that a radial clearance that may possibly be present between the two parts is distributed uniformly in the circumferential direction. The centering contours also causes that the centered arrangement, especially the radial clearance, will not change any more during the preparation of the welded connection or at least will not change substantially, so that the risk of needing expensive finishing operations is considerably reduced. The provision of a centering contour thus leads to improvement quality of manufacture along with reduced need for finishing operations.

According to an advantageous embodiment, the second part may be formed by a bottom, which has at least one passage opening, while the outer jacket section is formed by a conduit of the bottom, which encloses the respective passage opening, which projects from the bottom and which is formed integrally on the bottom. The first part is then formed by an attached part, which passes through the bottom in the passage opening, and the inner jacket section is formed by a jacket section of the attached part located in the passage opening. For such an exhaust system component with metallic bottom and metallic attached part, this means that such centering contours are formed integrally, projecting inwardly at the conduit of the bottom and/or projecting outwardly at a jacket section of the attached part and are located at spaced locations from one another in the circumferential direction.

As an alternative, provisions may be made for the first part to be formed by a static mixer, for the second part to be formed by an exhaust gas-carrying exhaust pipe, into which the mixer is inserted, for the inner jacket section to be formed by a jacket of the mixer, which encloses a mixture structure of the mixer, and for the outer jacket section to be formed by a pipe section in which the jacket of the mixer is located. For such an exhaust system component designed as an exhaust gas mixing pipe with metallic mixer and metallic exhaust pipe, this means that the centering contours are formed integrally, projecting outwardly on the jacket of the static mixer and/or projecting inwardly on the exhaust pipe and are arranged at spaced locations from one another in the circumferential direction.

In both cases, the centering contours can be taken into account in a simple and inexpensive manner during the manufacture of the bottom and of the attached part, on the one hand, as well as during the manufacture of the exhaust pipe and of the mixer, on the other hand As a consequence, the respective exhaust gas mixing tube or the respective exhaust system component can be manufactured quasi without additional costs.

Corresponding to an advantageous embodiment, the respective outer, especially conduit-side or exhaust pipe-side centering contour can be supported at the outer contour of the inner jacket section. A physical contact is achieved in this manner between the inner part, especially the attached part or mixer, and the outer part, especially the bottom or exhaust pipe, as a result of which centering is especially efficient.

According to another embodiment, the respective inner, especially jacket section-side or jacket-side, centering contour may be supported on the inner contour of the outer jacket section. This measure also leads to a direct physical contact, which efficiently brings about centering especially efficiently.

A radial clearance, which is bridged over by the centering contours, may be provided in an advantageous embodiment radially between the outer contour of the inner jacket section and the inner contour of the outer jacket section. This radial clearance is distributed uniformly in the circumferential direction by means of the centering contours, as a result of which a uniform air gap, which is interrupted locally in the circumferential direction by the centering contours only, develops in the circumferential direction between the parts inserted into one another.

Corresponding to another advantageous embodiment, at least one such centering contour may be formed by a local plastic deformation of the respective jacket section.

Embodying the respective centering contour by means of plastic deformation can be achieved at an especially low cost and can be integrated into the respective manufacturing operation by which the corresponding part is manufactured in a simple manner.

Corresponding to another advantageous embodiment, at least one such centering contour may be formed by a cam or by a bead. A centering contour designed as a cam leads to a punctiform contact between the parts inserted into one another. By contrast, a centering contour designed as a bead leads to a linear contact of the parts inserted into one another.

A variant in which the respective bead is oriented in the axial direction is of particular interest. The axial direction is the direction here in which the two parts are inserted into one another. The inserting of the two parts into one another becomes simpler due to the axial orientation (extending in the axial direction) of the respective bead.

Corresponding to another advantageous embodiment, the respective centering contour may be arranged at a spaced location from the weld joints in the circumferential direction.

In other words, the weld joints are prepared in the circumferential direction between adjacent centering contours. Damage to the centering contours due to the weld spots can be avoided in this manner. Also conceivable is an embodiment in which the weld joints are arranged exactly in the centering contours. The distance between the parts to be fastened to one another is minimized in the area of the centering contours, which considerably simplifies the arrangement of weld spots. In addition, or as an alternative, provisions may be made for the centering contours to be located at axially spaced locations from the respective welded connection. For example, a weld seam configured as a two-sheet-metal seam can connect an axial front side of the inner part with an axial front side of the conduit of the outer part.

According to another embodiment, provisions may be made for the bottom to be an end panel of a housing of an exhaust gas treatment device, wherein the attached part is an inlet pipe or an outlet pipe of the exhaust gas treatment device.

By contrast, the bottom is preferably an intermediate panel of a housing of an exhaust gas treatment device, which is arranged between two end panels of the housing. It is possible as a result, in particular, to connect the end panels sufficiently tightly with a housing jacket in order to avoid leakage of exhaust gas into the area surrounding the exhaust gas treatment device. Internal leaks may be tolerated here.

Corresponding to another advantageous embodiment, the attached part may be a jacket tube for receiving at least one exhaust gas treatment element. Such a jacket tube may usually also be called "canning." The respective exhaust gas treatment element may be held in such a jacket tube, for example, by means of a mounting mat. Such an exhaust gas treatment element is typically a catalytic converter element or a particle filter element. These exhaust gas treatment elements are preferably monolithic ceramic bodies.

As an alternative, the attached part may be a mixing tube for forming a mixing section or a static mixer. Both the mixing tube with mixing section and the static mixer are used to mix an exhaust gas flow with a reducing agent. Such a mixing tube as well as such a mixer are used especially in connection with an SCR system.

It is apparent that the above-mentioned features, which will also be explained later, can be used not only in the particular combination indicated, but in other combinations or alone as well, without going beyond the scope of the present invention.

Preferred embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 2:
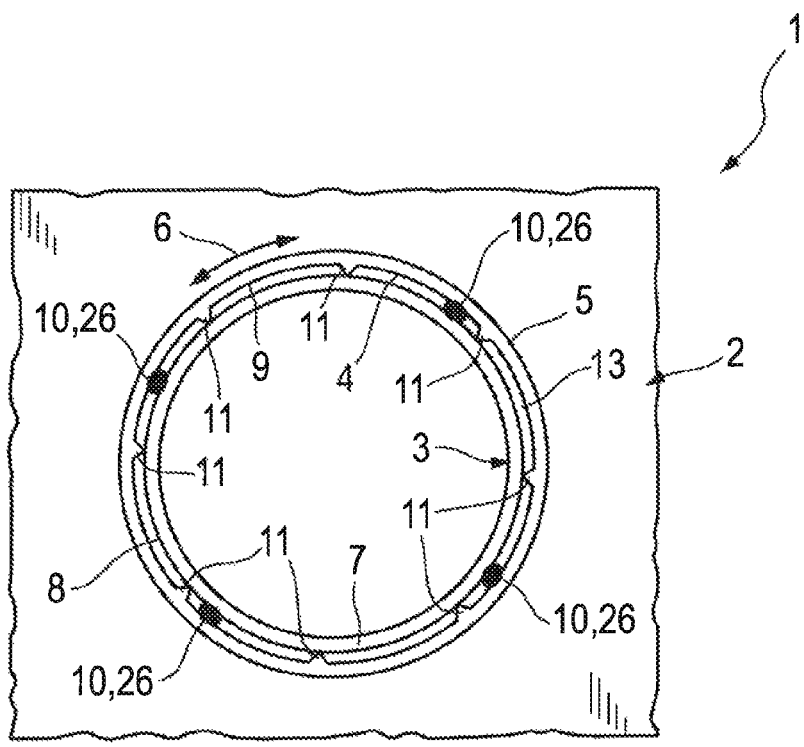
FIG. 2 is an axial sectional view of an exhaust system component, in the area of an attached part, according to another embodiment of the invention.
Figure 3:
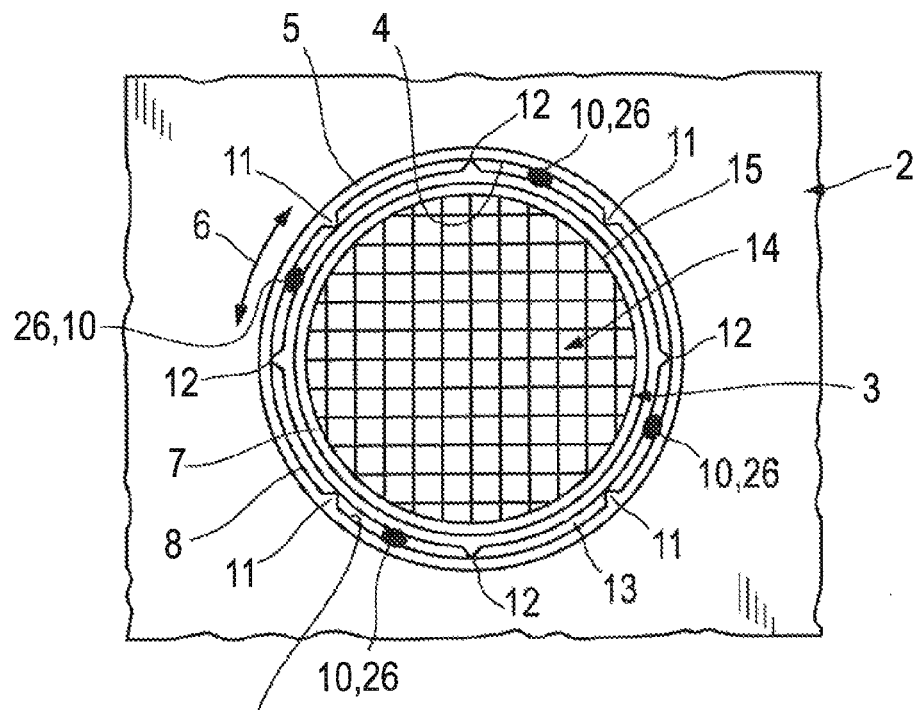
FIG. 3 is an axial sectional view of an exhaust system component, in the area of an attached part, according to another embodiment of the invention.
Figure 4:
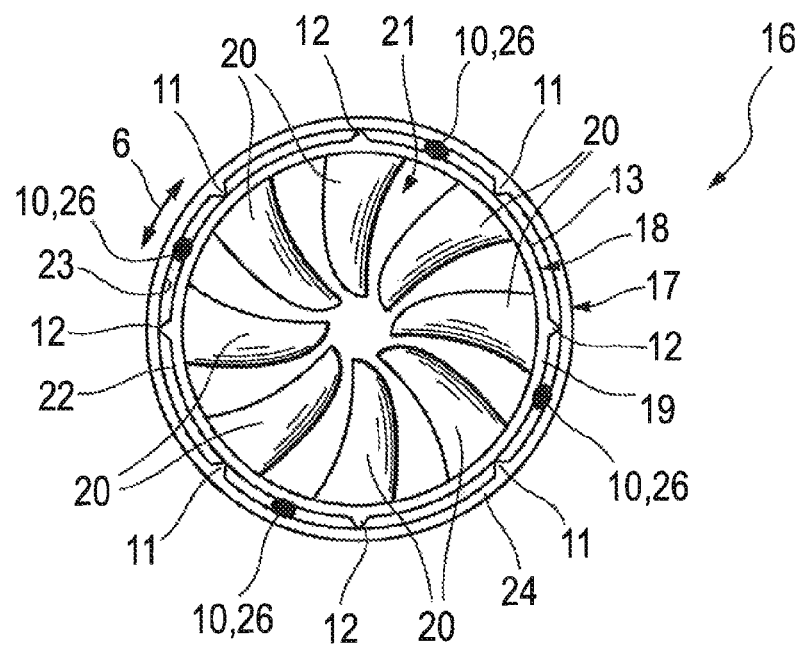
FIG. 4 is an axial sectional view of an exhaust system component, in the area of an attached part, according to another embodiment of the invention.

Referring to the drawings in particular, corresponding to FIGS. 1 through 6, an exhaust system component 1, which is intended for use in an exhaust system of an internal combustion engine, preferably of a motor vehicle, comprises at least one first part 3 according to FIGS. 1 through 3, 5 and 6 or a first part 18 according to FIG. 4, which is made of metal. Further, a second part 2 according to FIGS. 1 through 3, 5 and 6 and a second part 17 according to FIG. 4 are also provided, which are likewise made of metal. FIGS. 1 through 3, 5 and 6 show a general exhaust system component 1, in which the first part 3 is designed as an attached part, which will hereinafter likewise be designated by 3 and which can be passed through the second part 2, which is designed as a bottom here and will hereinafter be likewise designated by 2. Contrary to this, FIG. 4 shows as an example a special embodiment, in which the exhaust system component 1 is designed as an exhaust gas mixing tube 16, which may form per se a section in an exhaust gas line of the exhaust system or may be installed into a more complex exhaust system component. The first part 18 in this exhaust gas mixing tube 16 is formed by a static mixer, which will likewise be designated hereafter by 18, while the second part 17 is formed by an exhaust pipe, into which the mixer 18 is inserted, and which will likewise be designated by 17 hereafter.

Thus, corresponding to FIGS. 1 through 3, 5 and 6, the exhaust system component 1 comprises at least one metallic bottom 2, which is shown only partially here, and at least one metallic attached part 3. The bottom 2 has at least one passage opening 4, which is fully enclosed by a conduit 5 in a circumferential direction 6. The conduit 5 is formed integrally on the bottom 2. The conduit 5 projects from the bottom 2 in an axial direction extending at right angles to the drawing plane in FIGS. 1 through 3, which direction corresponds to a central longitudinal axis 25 in FIGS. 5 and 6. Such a conduit 5 is preferably manufactured in the form of a eyelet, i.e., by deforming an edge defining the passage opening 4 in the inward direction.

The attached part 3 has a jacket section 7, which is inserted axially into the passage opening 4. An outer contour 8 of the jacket section 7 is shaped here such that it is essentially complementary to an inner contour 9 of the conduit 5. The conduit 5 and the jacket section 7 each extend circularly in the examples being shown here. It is clear that any other desired round or nonround cross-sectional geometries may be used, in principle, without going beyond the idea of the present invention.

The conduit 5 defines an outer jacket section of the bottom 2 in the installed state, while the jacket section 7 arranged therein defines an inner jacket section of the attached part 3.

Figure 5:
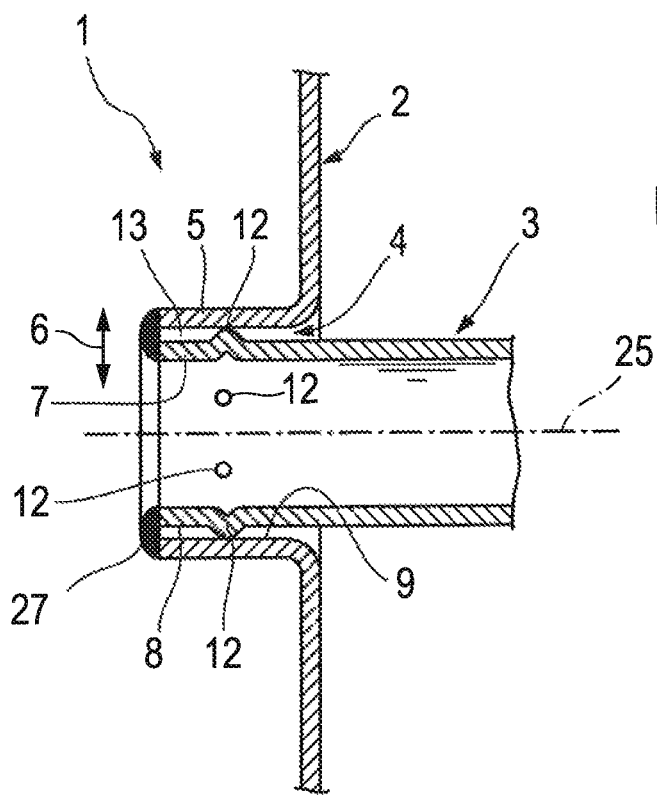
FIG. 5 is a longitudinal sectional view, through the exhaust system component in the area of the attached part, according to another embodiment of the invention.
Figure 6:
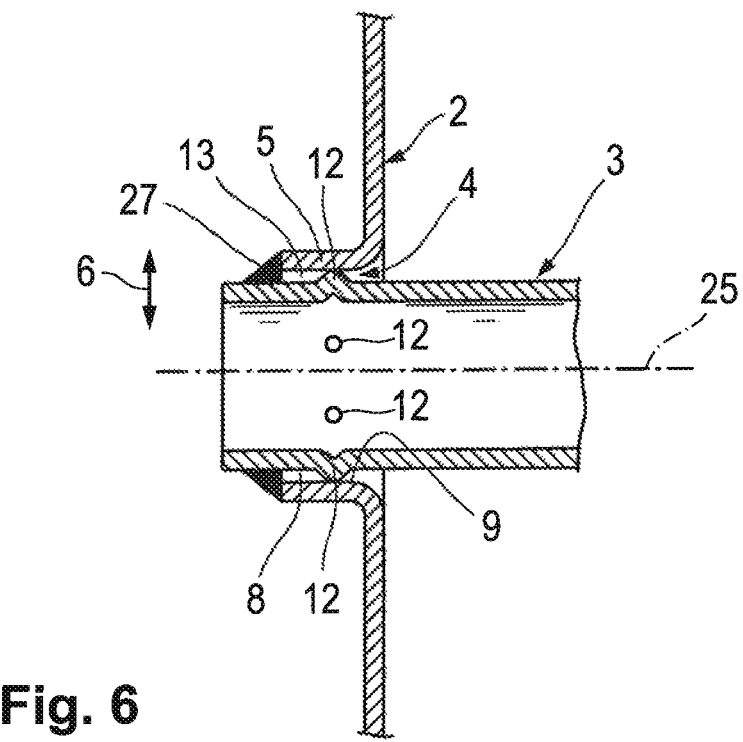
FIG. 6 is a longitudinal sectional view, through the exhaust system component in the area of the attached part, according to another embodiment of the invention.

A plurality of weld joints 10, which are arranged distributed in the circumferential direction 6, are arranged at spaced locations from one another in the circumferential direction 6 and are formed by welding spots 26 in this case, are provided in the embodiments according to FIGS. 1 through 4 for fixing the attached part 3 to the bottom 2. Contrary to this, FIGS. 5 and 6 show an embodiment each, in which only a single weld joint 10 is provided, which is designed as a circumferential weld seem 27 closed in the circumferential direction 6 in this case. The respective weld joint 10 permanently connects the conduit 5 to the jacket section 7. Three such weld joints 10 are shown purely as an example in the example according to FIG. 1. Four such weld joints 10 are shown purely as an example in the examples according to FIGS. 2 and 3. By contrast, only a single weld joint 10 is provided in FIGS. 5 and 6. It is clear that there may be more or fewer weld joints 10 as well.

The exhaust system component 1 being shown here is characterized, besides, by a plurality of centering contours 11, 12, which bring about centering of the jacket section 7 in the conduit 5. On the one hand, radially inwardly projecting centering contours 11 may be provided on the conduit 5 according to FIGS. 2 and 3. On the other hand, radially outwardly projecting centering contours 12 may be provided on the jacket section 7 according to the embodiments shown in FIGS. 1, 3, 5 and 6. The centering contours 11 provided on the conduit 5 are formed integrally on the conduit 5. The centering contours 12 provided on the jacket section 7 are formed integrally on the jacket section 7. The centering contours 11, 12 are arranged at spaced locations from one another in the circumferential direction 6. The centering contours 11, 12 are advantageously dimensioned such that they bring about direct contact between the two parts inserted into one another, i.e., of the bottom 2, on the one hand, and of the attached part 3, on the other hand On the one hand, the conduit-side centering contours 11 may be supported directly on the outer contour 8 of the jacket section 7. On the other hand, the jacket section-side centering contours 12 may be supported directly on the inner contour 9 of the conduit 5.

A radial clearance 13, which is bridged over by the centering contours 11, 12, is formed radially between the outer contour 8 of the jacket section 7 and the inner contour of the conduit 5 in the embodiments being shown here. The centering contours 11, 12 bring about a uniform distribution of the radial clearance 13 in the circumferential direction 6 due to the concentric orientation of the two parts 2, 3 inserted into one another.

The respective centering contour 11, 12 is advantageously formed by a local plastic deformation of the conduit 5 and of the jacket surface 7. For example, such a centering contour 11, 12 may be formed by a punctiform cam or by a linear bead. The respective bead advantageously extends in parallel to the axial direction in this case.

The centering contours 11, 12 are arranged at spaced locations from the weld joints 10 in the circumferential direction 6 in the embodiments shown here in FIGS. 1 through 4. The centering contours 12 are arranged at axially spaced locations from the weld joint 10 in the embodiments shown in FIGS. 5 and 6. The weld seam 27 is configured as a two-sheet-metal seam in both cases. The weld seam 27 is arranged on the two axial front sides of the attached part 3 and of the conduit 5 in the embodiment shown in FIG. 5, such that it bridges over and tightly closes the radial gap 13. Contrary to this, the weld seam 27 in the embodiment shown in FIG. 6 is arranged such that it connects the axial front side of the conduit 5 to the outer contour 8 and to the outside of the attached part 3 and likewise tightly closes the radial gap 13.

The bottom 2 may be, in principle, an end panel of a housing, not shown here, of an exhaust gas treatment device in the embodiments according to FIGS. 1 through 3, 5 and 6. The attached part 3 may now be advantageously an inlet pipe or an outlet pipe of this exhaust gas treatment device. As a alternative hereto, bottom 2 may also be an intermediate panel of a housing, not shown here, of an exhaust gas treatment device. Such an intermediate panel is located between two end panels of the housing. The attached part 3, which is inserted into the passage opening 4 of such an intermediate panel, may be, according to FIG. 3, for example, a jacket tube for receiving an exhaust gas treatment element 14. The exhaust gas treatment element 14 is, for example, a particle filter element or a catalytic converter element. The exhaust gas treatment element 14 may be fixed in its position in the jacket tube, i.e., in the attached part 3, by means of a mounting mat 15. According to FIGS. 1 and 2, the attached part 3 may also be a mixing tube for forming a mixing section for mixing an exhaust gas flow with a reducing agent. The attached part 3 may also be a static mixer 18, as it is provided in the embodiment shown in FIG. 4.

Corresponding to FIG. 4, an exhaust gas mixing tube 16, which is suitable for use in an exhaust system of an internal combustion engine, especially of a motor vehicle, may have an exhaust gas-carrying exhaust pipe 17 and a static mixer 18 inserted therein. The exhaust pipe 17 is intended for installation in the exhaust system or for installation in an exhaust gas treatment device of the exhaust system. The static mixer 18 is inserted into the exhaust pipe 17 and is used to mix the exhaust gas flow, for example, with a reducing agent, during the operation of the exhaust system. The mixer 18 has a jacket 19, from which, for example, a plurality of guide blades 20 may project radially inwardly. The guide blades 20 now form a mixer structure 21, which is enclosed by the jacket 19. Jacket 19 has an outer contour 22, which has essentially a shape complementary to an inner contour 23 of the exhaust pipe 17. A plurality of weld joints 10, which are located at spaced locations from one another in the circumferential direction and which permanently connect the jacket 19 each to the exhaust gas pipe 17, are provided for fixing the mixer 18 to the exhaust gas pipe 17. The weld joints 10 are preferably weld spots in this case as well.

In the installed state, the jacket 19 defines an inner jacket section of the mixer 18, while a pipe section 24 of the exhaust gas pipe 17, in which the jacket 19 is positioned, defines an outer jacket section of the exhaust gas pipe 17.

To center the mixer 18 in relation to the exhaust gas pipe 17 in this exhaust gas mixing tube 16, a plurality of centering contours 11, 12 may be provided in this case as well. The inner centering contours 11 are again formed integrally on the exhaust gas pipe 17, projecting inwardly. The other centering contours 12 are formed integrally on the jacket 19, projecting outwardly. The centering contours are arranged at spaced locations from one another in the circumferential direction 6 in this case as well.

The centering contours 11, 12 are advantageously coordinated with the exhaust gas pipe 17 and the mixer 18 such that the exhaust gas pipe-side centering contours 11 are supported on the outer contour 22 of the jacket 19. The jacket-side centering contours 12 may be advantageously supported on the inner contour 23 of the exhaust gas pipe 17.

Figure 1:
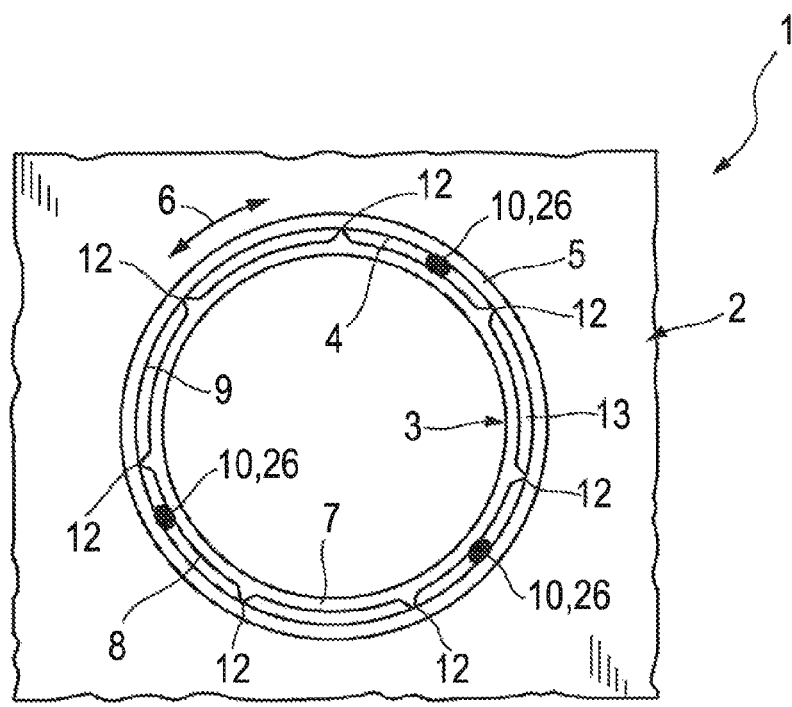
FIG. 1 is an axial sectional view of an exhaust system component, in the area of an attached part, according to an embodiment of the invention.

Even though both inwardly projecting centering contours 11 and outwardly projecting centering contours 12 are provided in the embodiment shown in FIG. 4, analogously to the embodiment shown in FIG. 3, embodiments are also conceivable in which only inwardly projecting centering contours may be present analogously to FIG. 2 or in which only outwardly projecting centering contours 12 may be present analogously to FIGS. 1, 5 and 6.

A radial clearance 13, which is bridged over by the centering contours 11, 12, may also be present radially between the outer contour 22 of the jacket 19 and the inner contour 23 of the exhaust gas pipe 17 in the embodiment shown in FIG. 4 as well.

The centering contours 11, 12 are advantageously formed by local plastic deformation of the exhaust gas pipe 17 and of the jacket 19 in this example as well. At least one such centering contour 11, 12 may be formed by a punctiform cam or by a linear bead. Such a bead-shaped centering contour 11, 12 may extend in the axial direction.

The arrangement of the weld joints 10 is advantageously coordinated with the positioning of the centering contours 11, 12 in this case as well, such that the weld joints 10 are located at spaced locations from the centering contours 11, 12 in the circumferential direction.

While specific embodiments of the invention have been shown and described in detail to illustrate the application of the principles of the invention, it will be understood that the invention may be embodied otherwise without departing from such principles.

What is claimed is:

1. An exhaust system component for an exhaust system of an internal combustion engine, the exhaust system component comprising:
    a metallic first part with an annular inner section;
    a metallic second part with an annular outer section, the metallic first part being inserted into the metallic second part such that the inner section of the first part is arranged coaxially in the outer section of the second part;
    a plurality of centering contours formed integrally on the outer section, projecting inwardly toward the inner section, or formed integrally on the inner section, projecting outwardly toward the outer section or both formed integrally on the outer section, projecting inwardly toward the inner section, and formed integrally on the inner section, projecting outwardly toward the outer section, the centering contours being located at spaced locations from one another in a circumferential direction for centering the inner section in the outer section; and
    a weld joint permanently connecting the outer section to the inner section, wherein:
    the second part is formed by an exhaust gas treatment device housing panel having a passage opening;
    the annular outer section is formed by a conduit of the housing panel, the conduit enclosing the passage opening, the conduit being formed integrally with the housing panel and projecting from a remainder of the housing panel;
    the first part is formed by an attached part, which passes through the housing panel in the passage opening;
    the inner section is formed by a section of the attached part, which said inner section is located in the passage opening; and
    the centering contours center the annular inner section in the conduit.

2. An exhaust system component in accordance with claim 1, wherein the housing panel is an end panel of a housing of an exhaust gas treatment device, wherein the attached part is an inlet pipe or an outlet pipe of the exhaust gas treatment device.

3. An exhaust system component in accordance with claim 1, wherein the housing panel is an intermediate panel of a housing of an exhaust gas treatment device, which is arranged between two end panels of the housing.

4. An exhaust system component in accordance with claim 3, wherein the attached part is a jacket tube for receiving at least one exhaust gas treatment element or a mixing tube for forming a mixing section or a static mixer for mixing an exhaust gas flow with a reducing agent.

5. An exhaust system component in accordance with claim 1, wherein the centering contours comprise an outer centering contour supported on an outer contour of the inner section.

6. An exhaust system component in accordance with claim 1, wherein the centering contours comprise an inner centering contour supported on an inner contour of the outer section.

7. An exhaust system component in accordance with claim 1, wherein a radial clearance, which is bridged over by the centering contours, is provided radially between an outer contour of the inner section and an inner contour of the outer section.

8. An exhaust system component in accordance with claim 1, wherein at least one of the centering contours is formed by a local elastic deformation of the outer section or of the inner section.

9. An exhaust system component in accordance with claim 1, wherein at least one of the centering contours is formed by a cam or by a bead.

10. An exhaust system component in accordance with claim 9, wherein the bead is oriented in an axial direction of the annular inner jacket section and the annular outer jacket section.

11. An exhaust system component in accordance with claim 1, wherein:
the weld joint comprises a circumferential weld seam closed in the circumferential direction; and
the weld seam is located at an axial spaced location from the centering contours.

12. An exhaust system component in accordance with claim 1, further comprising at least another weld joint to provide a plurality of weld joints comprising weld spots located at spaced locations from one another in the circumferential direction.

13. An exhaust system component in accordance with claim 12, wherein the each of the respective centering contours is arranged at a spaced location from the weld joints in at least one of the circumferential direction and in an axial direction.

14. An exhaust system component for an exhaust system of an internal combustion engine, the exhaust system component comprising:
a metallic component part with a component part annular outer section defining a passage opening;
a metallic attached part with an attached part annular inner section, the metallic attached part being inserted into the opening of the metallic component part such that the component inner section is arranged in the component outer section, at least one of the component outer section and the component inner section comprising integral centering contours, at least one of projecting from the component outer section inwardly toward the component inner section and projecting from the component inner section outwardly toward the outer section, the centering contours being located at spaced locations from one another in a circumferential direction for centering the component inner section in the component outer section; and
a weld joint permanently connecting the component outer section to the component inner section, wherein:
the metallic component part is a panel of a housing of an exhaust gas treatment device;
the component outer section is formed by a conduit of the panel;
the conduit encloses the passage opening;
the conduit is formed integrally with the panel and projects from a remainder of the panel;
the metallic attached part passes through the panel in the passage opening; and
the metallic attached part is an inlet pipe or an outlet pipe of the exhaust gas treatment device.

15. An exhaust system component in accordance with claim 14, wherein:
the metallic attached part further comprises a static mixer;
the metallic component part is formed by an exhaust gas-carrying exhaust gas pipe, into which the mixer is inserted;
the component inner section encloses a mixing structure of the static mixer;
the component outer section is formed by a pipe section of the exhaust gas pipe, in which the component inner section is located; and
the centering contours center the component inner section in the exhaust gas pipe and are formed one of integrally on the exhaust gas pipe, projecting inwardly, and integrally on the component inner section, projecting outwardly.

16. An exhaust system component in accordance with claim 14, wherein at least one of the centering contours is formed by a cam or by a bead extending in an axial direction of the passage opening.

17. An exhaust system component in accordance with claim 14, wherein:
the weld joint comprises a circumferential weld seam closed in a circumferential direction.

* * * * *